United States Patent [19]

Wood et al.

[11] 4,436,371

[45] Mar. 13, 1984

[54] VEHICLE MIRROR ASSEMBLY

[75] Inventors: Denis Wood, Dublin, Ireland; John F. Thomas, Jr., Holland, Mich.; Barry Dipper, Cardiff, Wales

[73] Assignee: Donnelly Mirrors, Inc., Holland, Mich.

[21] Appl. No.: 276,969

[22] Filed: Jun. 24, 1981

[51] Int. Cl.³ .............................................. G02B 17/00
[52] U.S. Cl. .................................. 350/281; 350/278; 350/279
[58] Field of Search ....................... 350/279, 280, 281

[56] References Cited

U.S. PATENT DOCUMENTS

| D. 81,345 | 6/1930 | Mariani . |
| D. 84,252 | 5/1931 | Mariani . |
| D. 170,683 | 10/1953 | Fischer . |
| D. 170,684 | 10/1953 | Fischer . |
| D. 178,645 | 9/1956 | Collura . |
| D. 178,646 | 9/1956 | Collura . |
| D. 179,987 | 4/1957 | Stortz . |
| D. 188,370 | 7/1960 | Grove . |
| D. 192,633 | 4/1962 | Stortz . |
| D. 192,728 | 5/1962 | Walker . |
| D. 197,888 | 4/1964 | Jepson et al. . |
| D. 250,332 | 11/1978 | Aiga . |
| 614,503 | 11/1898 | Sackett . |
| 925,524 | 6/1909 | Steinmetz . |
| 1,252,207 | 1/1918 | Walker . |
| 1,929,201 | 10/1933 | Frohlich et al. . |
| 2,088,320 | 7/1937 | De Vries . |
| 2,457,639 | 12/1948 | Brooks . |
| 2,771,263 | 11/1956 | Boho . |
| 2,775,919 | 1/1957 | Fischer . |
| 2,823,479 | 2/1958 | Adanowski . |
| 2,940,361 | 6/1960 | Francisco . |
| 2,968,995 | 1/1961 | Holden . |
| 3,120,369 | 2/1964 | Gray, Jr. . |
| 3,131,251 | 4/1964 | Ryan . |
| 3,427,095 | 2/1969 | Dykema et al. . |
| 3,512,746 | 5/1970 | Vitaloni et al. . |
| 3,513,807 | 5/1970 | Helle . |
| 3,534,938 | 10/1970 | Jordan et al. . |
| 3,564,984 | 2/1971 | Alexander . |
| 3,589,662 | 6/1971 | Lagrange . |
| 3,601,352 | 8/1971 | Jensen et al. . |
| 3,666,225 | 5/1972 | Weinberger . |
| 3,800,449 | 4/1974 | Minatodani et al. . |
| 3,828,623 | 8/1974 | Zillner . |
| 3,869,017 | 3/1975 | Feustel et al. . |
| 3,918,799 | 11/1975 | Kurz, Jr. et al. . |
| 3,954,242 | 5/1976 | Yoda . |
| 4,012,022 | 3/1977 | Tomita . |

FOREIGN PATENT DOCUMENTS

| 1780550 | 3/1965 | Fed. Rep. of Germany . |
| 1199641 | 8/1965 | Fed. Rep. of Germany . |
| 1275394 | 8/1968 | Fed. Rep. of Germany . |
| 2024118 | 11/1970 | Fed. Rep. of Germany . |
| 2153875 | 5/1973 | Fed. Rep. of Germany . |
| 2414075 | 3/1974 | Fed. Rep. of Germany . |
| 2357543 | 9/1974 | Fed. Rep. of Germany . |
| 2530596 | 1/1977 | Fed. Rep. of Germany . |
| 2539681 | 3/1977 | Fed. Rep. of Germany . |
| 7111507 | 4/1971 | France . |
| 7245225 | 12/1972 | France . |
| 7409477 | 10/1973 | France . |
| 7316857 | 11/1974 | France . |
| 2354219 | 6/1976 | France . |
| 7710637 | 4/1977 | France . |
| 4137 | 1/1977 | Ireland . |
| 421078 | 1/1935 | United Kingdom . |
| 742838 | 1/1956 | United Kingdom . |
| 768637 | 2/1957 | United Kingdom . |
| 1096178 | 1/1968 | United Kingdom . |

OTHER PUBLICATIONS

George C. Knight Co. brochure entitled "Crusader—Complete View Mirrors", dated Oct. 26, 1949.

U.S. Government "Motor Vehicle Safety Standard No. 111 for Rearview Mirrors", dated Feb. 26, 1977.

EEC European Motor Vehicle Regulations 0.08.39, 2.04.05, dated Mar. 1, 1971.

Federal Motor Vehicle Safety Standard No. 111, "Laboratory Procedures for: Rearview Mirrors", dated Nov. 29, 1978, U.S. Dept. of Transportation, National Highway Traffic Safety Administration, Enforcement Office of Vehicle Compliance.

*Primary Examiner*—John K. Corbin
*Assistant Examiner*—Paul M. Dzierzynski
*Attorney, Agent, or Firm*—Price, Heneveld, Huizenga & Cooper

[57] ABSTRACT

A day/night rearview mirror assembly for vehicles including a one-piece, molded, resinous mirror case having flexible, resilient portions and a substantially rigid pivot actuator which is biased by the case into either a day or night position. Movement of the actuator changes the position of the case and mirror element thereby changing the amount of light reflected. An interference fit between supports for the actuator within the case and the pivot actuator expands and pre-stresses the case to provide a predetermined biasing force which must be overcome by a pivoting force to move the actuator between its positions. A continuous lip extending around the periphery of the case allows snap-in insertion and permanent retention of a preferably prismatic mirror element. The retaining lip is sized to maintain coverage of the edge of the mirror element even during flexing of the case while the actuator is pivoted.

65 Claims, 17 Drawing Figures

VEHICLE MIRROR ASSEMBLY

BACKGROUND OF THE INVENTION

This invention relates to mirror assemblies for vehicles, and more particularly, to an improved rearview mirror assembly for mounting within a vehicle. The assembly allows movement between a full light-reflectivity day position and a reduced light-reflectivity night position with a simplified, more reliable structure.

Rearview mirror assemblies allowing movement between day and night light-reflectivity positions have been used for many years. Governmental concern for strength, bending resistance, breakaway ability, and other safety requirements, as well as recent concern for weight and cost reduction in vehicles to provide energy savings, have dictated a reexamination of existing mirror assembly designs.

In the past, different day/night rearview mirror assemblies had been designed for different vehicles and the varying requirements of different countries in which automobiles or other vehicles are manufactured. In the United States, not only must the inside rearview mirror for a passenger car provide a predetermined field of view, but it must be mounted so that it is stably supported, is both horizontally and vertically adjustable, and can deflect, collapse or break away from its supported position without leaving sharp edges when subjected to a predetermined force in the forward direction within predetermined angular boundaries.

In the European Economic Community, motor vehicle regulations require that a rearview mirror assembly be able to withstand a static load test including the support of a 25 kilogram weight at one edge while any bracket support and the opposite edge are fixedly restrained for one minute. The assembly must pass the test without breaking or, if the assembly does break, without glass fragments being released. Alternately, the mirror may be made of safety glass.

Certain manufacturing difficulties have also been discovered with prior known assemblies. For instance, in the manufacture of certain rearview mirror assemblies it is necessary to heat and form a rectilinear lip on a molded case into a rounded edge covering the periphery of the mirror element after its insertion within a case. Difficulty has been experienced in consistently obtaining uniform mirror retaining lips in such assemblies. In addition, it was desired to more easily obtain positive control of the day/night pivoting action of the mirror assembly, especially in varying weather and climatic conditions.

With respect to assemblies which include a substantially rigid case with a pivot actuator including a flexible portion which provides resilience during pivoting, it was desired to obtain greater strength through the assembly area in which the pivot actuator was mounted.

Further, it is necessary that a mirror assembly meet minimum vibration standards so as to present a clear image when viewed by the driver of the vehicle, all while maintaining strength sufficient to meet the above-noted governmental regulations. A reduction in the complexity of prior assemblies was also desired to both decrease costs and simplify manufacturing requirements without sacrificing functional features.

The present invention was developed as a simplified, reliable, inside, day/night rearview mirror assembly for use in virtually all currently manufactured general use vehicles. The objective was to provide a mirror assembly useful in varying climatic conditions and which takes into account the governmental safety requirements for the major vehicular producing countries of the world. The present mirror assembly was thus designed and produced in recognition of the need for a simplified structure for retaining a mirror element within a case, the need to keep manufacturing rejection rates of the assemblies to a minimum, the need for simpler, more positive control of the day/night pivoting action while providing fewer overall parts, and the need to maintain strength, reduced weight, and resistance to vibration during use.

SUMMARY OF THE INVENTION

Accordingly, the present invention provides a simplified, reliable, inside day/night rearview mirror assembly for vehicles which is adapted to provide easier assembly and smaller manufacturing rejection rates, simplified retention of the mirror element within the case, proper resistance to vibration during use, fewer overall parts, more positive control of day/night positioning, and proper strength with reduced weight. In addition, the present invention provides the capability of use with a one-piece mirror support bracket as disclosed in copending, commonly assigned United States patent application Ser. No. 276,839, filed on even data herewith, entitled "REARVIEW MIRROR SUPPORT BRACKET," and invented by Denis Wood, John F. Thomas, Jr., Barry Dipper, Philip D. Stegenga, John H. Veldkamp, William L. Katsma, Robert L. Norton and Denis Rick. Together with such bracket, the present rearview mirror assembly takes into account the governmental vehicle safetly regulations in both the United States and the European Economic Community and provides easier, less costly manufacturing while maintaining the proper strength and vibration requirements, all with a minimal overall weight. The combination of the present rearview mirror assembly and the mirror support bracket is disclosed and claimed in copending, commonly assigned United States patent application Ser. No. 276,838, filed on even date herewith, entitled "VEHICLE MIRROR AND SUPPORT ASSEMBLY, and invented by Denis Wood, John F. Thomas, Jr., Barry Dipper, Philip D. Stegenga, John H. Veldkamp, William L. Katsma, Robert L. Norton and Denis Rick.

In one aspect, the present invention provides a day/night rearview mirror assembly for vehicles including a mirror case formed in one piece from resinous material and having flexible, resilient portions, and a rigid actuator means for moving the case between day and night positions. The case has a back, a continuous peripheral side wall adapted to outline the peripheral edge of a mirror element, retaining means for returning the mirror element in the case, and support means for supporting the actuator means within the case. The actuator means includes mounting means for mounting a bracket for securing the assembly on a support and pivot means for pivoting the actuator and case between the said positions. The case biases the actuator toward one or the other of the said positions such that a predetermined force is required to pivot the actuator and case with the pivot means.

In other aspects of the invention, the molded, mirror case includes a preformed lip on the continuous peripheral side wall which retains and allows snap-in insertion of the mirror element within the case. The pivot actuator is a substantially rigid toggle member. The case includes portions which are sufficiently flexible and resilient to bias the toggle member toward one or the other of the toggle member positions. The lip extends inwardly a distance sufficient such that, when a mirror element is received with the case, and the toggle member is pivoted with the pivot means, the lip will continue to cover the edge of the mirror element and a predetermined portion of the mirror element spaced inwardly from the edge thereof regardless of the flexing action of the case and the lip during pivoting.

In yet other aspects of the invention, the back of the case curves outwardly to an area of maximum overall case depth to facilitate flexing of the case during pivoting of the pivot means. Multi-faceted pivot limiting stop tabs are provided on the pivot actuator for positive control of the pivotal case movement between day and night positions and to allow easier insertion of the actuator within the case. In addition, the mounting means on the pivot actuator may be either a socket for receiving a ball member from a support bracket or an outwardly extending ball member to be secured in a suitable support bracket.

The snap-in retention of the mirror element within the case provides simplified assembly. Even during case flexure when the pivot actuator is moved between its positions, the retention lip provides sufficient coverage of the peripheral edge of the mirror element to hide minor chips, scratches or edge deviations so that fewer mirror assemblies need be rejected after manufacture. In addition, the multi-faceted stop tabs on the pivot actuator allow easier insertion of the actuator within the case than with prior known actuators and provide more positive control of day/night pivoting after assembly. The present assembly incorporates fewer overall parts while maintaining strength, vibration resistance and minimal weight. In addition, the assembly is fully compatible with a support bracket such as that shown in copending application Ser. No. 276,838 to allow proper use and operation in a wide range of vehicles as well as proper safety breakaway and adjustability features when so combined.

These and other objects, advantages, purposes and features of the invention will become more apparent from a study of the following description taken in conjunction with the drawings.

DESCRIPTION OF THE PREFERRED EMBODIMENTS

Referring now to the drawings in greater detail, FIGS. 1-6 illustrate a first embodiment of the inside rearview mirror assembly 10 including a molded, resinous mirror case 12 receiving a mirror element 14 and a rigid pivot actuator or toggle member 50 or 50'. Actuator 50 or 50' is pivotally mounted in the case and preferably molded from resinous material as will be described more fully hereinafter. Mirror element 14 is a prism of transparent glass, plexiglass, plastic or other transparent, rigid material having a layer of reflective material 16 (FIG. 5) placed on its rear surface. Preferably, element 14 is a glass prism having a taper of 3° 35'±0° 10' and a maximum thickness of 0.218±0.015 inches. The overall element is 9.27±0.015 inches by 2.265±0.015 inches with rounded corners, slightly curved edges, and a frosted non-glare edge all around. Such reflective layer may be coated with a protective primer paint layer followed by a flexible resilient polyvinyl chloride plastisol layer 18 or a covering of tape for safety reasons to prevent scattering of glass fragments should the mirror be broken.

Figure 5:
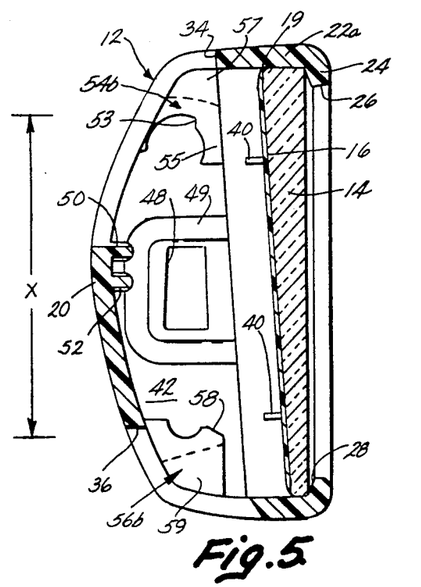
FIG. 5 is a side sectional view taken along plane V—V of FIG. 4.
Figure 6:
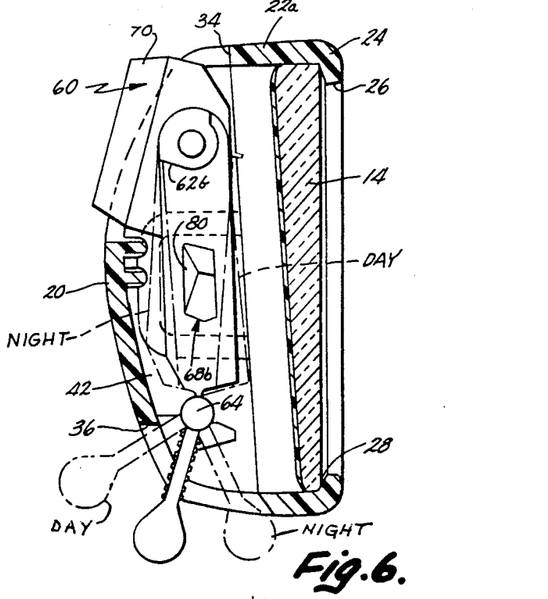
FIG. 6 is a side sectional view of the mirror case and mirror element together with the pivot actuator mounted therein similar to FIG. 5.

In the preferred embodiment, layer 18 has a thickness of approximately 0.015 to 0.045 inches which thickness tapers and becomes less adjacent the edges of the mirror element 14 (see FIGS. 5 and 6). The reflective layer 16 is normally covered with a protective layer of primer paint over which the plastisol layer 18 is applied. The primer paint is preferably a heat sensitive adhesive and includes a pigment for hiding the reflective layer on the mirror. Acceptable products include Daubond DC-8660 by Daubert Chemical Co. of Oakbrook, Ill. or product No. A 1103 B, by B. F. Goodrich Chemical Company, of Cleveland, Ohio. Both have adhesive bonding quantities when heated.

After application of these various layers, the mirror element and layers are cured by heating to a temperature of approximately 175°-200° F. At this approximate temperature, the PVC plastisol 18 is chemically converted to polyvinyl chloride. Sufficient plastisizer is originally included in the plastisol to leave the cured layer 18 inherently resilient, flexible and impressionable at all temperatures to which vehicles including such mirrors are normally subjected, namely, a range of −40° F. to 190° F.

Although application of the PVC layer 18 is preferably done in plastisol form, the PVC in non-plastisol form may be injection molded onto the back of the mirror. When PVC is injection molded on the mirror back, it has been found that an additional layer of bonding agent or adhesive beneath the plastisol layer, which securely bonds the plastisol layer to the mirror element, is preferred. Such suitable heat sensitive adhesive is product No. J 1199-B, produced by Armstrong Cork Company, of Cincinnati, Ohio. Other materials having the above characteristics of resiliency and flexibility over a wide temperature range, which may also be used for layer 18, include polyvinyl acetate, polyurethane and silicone sealants.

As shown in FIGS. 5 and 6, the planar front surface and planar rear surface of mirror element 14 are not parallel thereby defining the prism and enabling adjustment of the mirror assembly for day and night use to reduce the overall intensity of the light reflected from the mirror. Thus, when the assembly is pivoted (FIG. 6) such that the case positions the mirror element with incident light reflected off the coated rear surface 16, substantially all, approximately 88 percent of the light hitting that surface will be reflected. However, when the case is pivoted such that light is reflected off the front, uncoated surface, only approximately 4 percent of the incident light will be reflected. Glare in the eyes of the driver viewing the mirror is thereby reduced.

As noted above, the rearview mirror assembly 10 is designed to be used with a support bracket 15 of the type disclosed in either copending application Ser. No. 276,839 or 276,838. Bracket 15 enables the mounting and adjustment of assembly 10 on a support which is typically secured on a windshield of a vehicle to provide proper adjustment for all sizes of drivers for such a vehicle. Bracket 15, which forms no part of the present invention, is also described and claimed in combination with the present rearview mirror assembly in application Ser. No. 276,838 noted above.

As is best seen in FIGS. 3-6, molded mirror case 12 includes a contoured, curved back 20 and a continuous peripheral side wall 22 which extends around the entirety of the case outlining the periphery of mirror element 14 when received therein. Side wall 22 defines top 22a, bottom 22b, and ends 22c and 22d. As shown in FIGS. 5 and 6, the thickness of the case back 20 is substantially uniform and preferably 2.5 mm while peripheral side wall 22 tapers outwardly to an increased thickness, preferably 3.0 mm, toward the front of the case where it merges with a continuous, inwardly extending mirror element retaining lip 24. Lip 24 extends around the entirety of side walls 22 and has a curved outer shape ending at inner edge 26 and an inclined under surface 28 adapted to face the mirror element 14. Inclined surface 28 prevents the lip from catching on the corner of the glass when the case flexes. The curved outer surface of the lip 24 cooperates with the bevel 19 on the rear surface of mirror element 14 when the mirror element is snapped into the case 12 by camming the lip and peripheral side wall combination outwardly in the manner shown in FIG. 10. Lip 24 extends inwardly over the entire peripheral edge of the mirror element a predetermined distance, 2.5 mm in the preferred embodiment, and is calculated to mask any edge defects in the glass or other mirror element and also to retain the mirror element in place even when the case flexes during pivoting of the day/night pivot actuator as set forth below.

Figures 1, 2:
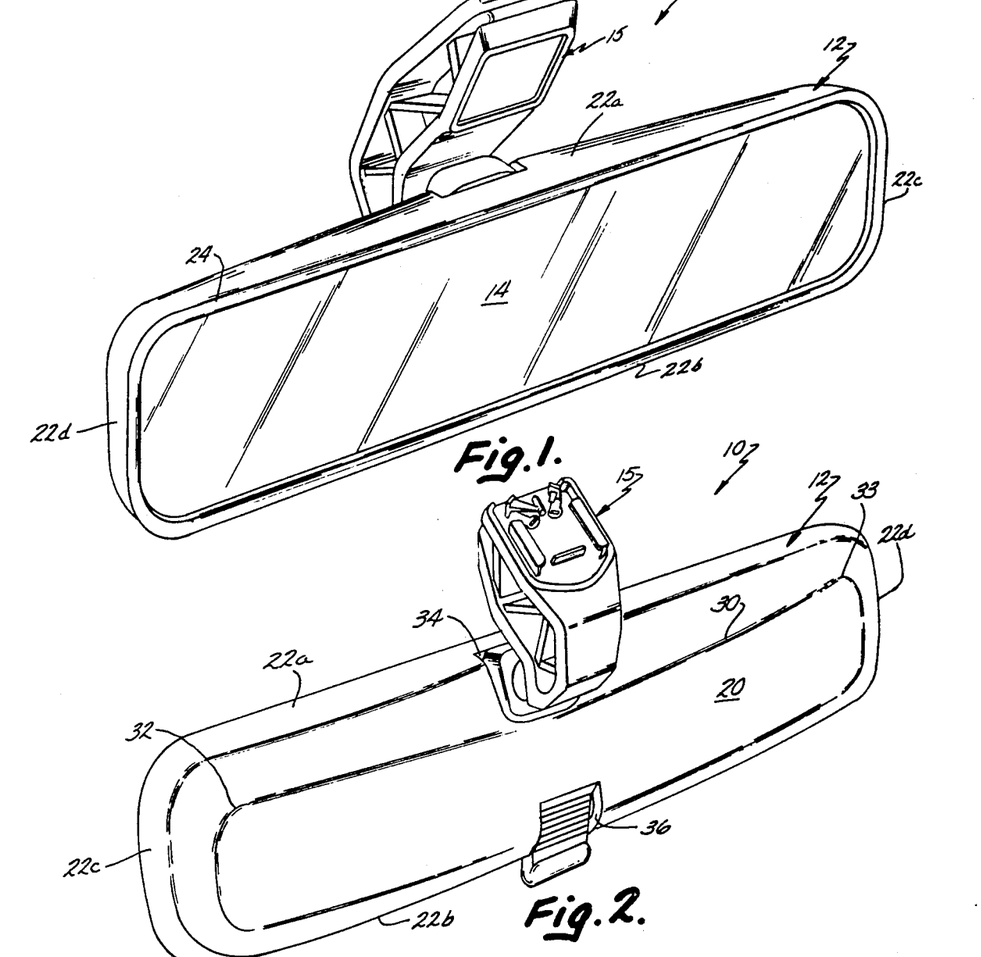
FIG. 1 is a front perspective view of the rearview mirror assembly of the present invention together with a suitable, breakaway-type, mirror mounting bracket.
FIG. 2 is a rear view of the rearview mirror assembly of the present invention together with the mirror mounting bracket shown in FIG. 1.

As shown in FIGS. 2 and 5, the case back curves outwardly to an area of maximum thickness approximately at the central portion of the case as defined by a contour line 30 which extends from points 32, 33 adjacent the upper corners at either end of the case downwardly in a gentle curve toward the middle of the case intermediate upper and lower corner apertures 34 and 36 but immediately adjacent the bottom portion of the uppermost aperture 34. Contour line 30 not only defines an increased depth for the overall case, but also facilitates flexure of side walls 22 when the pivot actuator is pivoted within the case and/or the mirror element 14 is snapped in place during assembly of the mirror assembly. Along with ribs 50, 52, the contour of the case also increases longitudinal bending resistance or stiffness helping to meet governmental regulations. This contour provides a somewhat bulbous shape to the mirror assembly as shown in FIGS. 4-6, 10 and 11.

Figure 3:
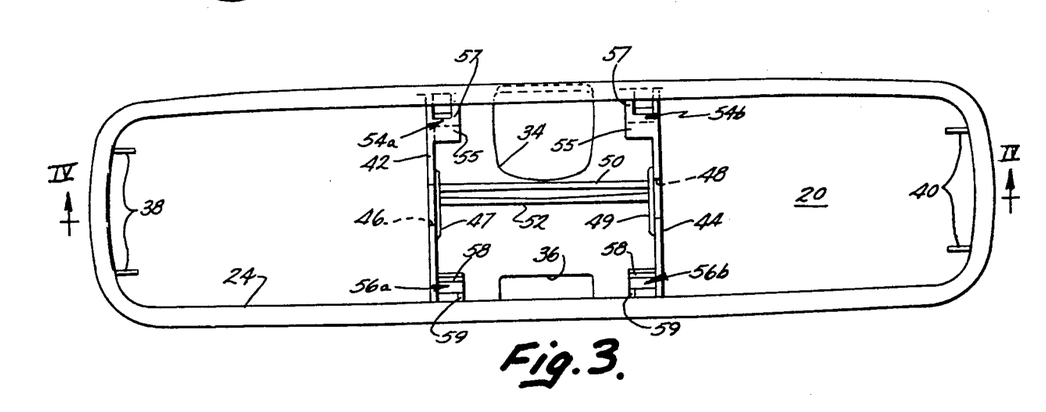
FIG. 3 is a front plan view of the molded mirror case of the present invention.
Figure 4:
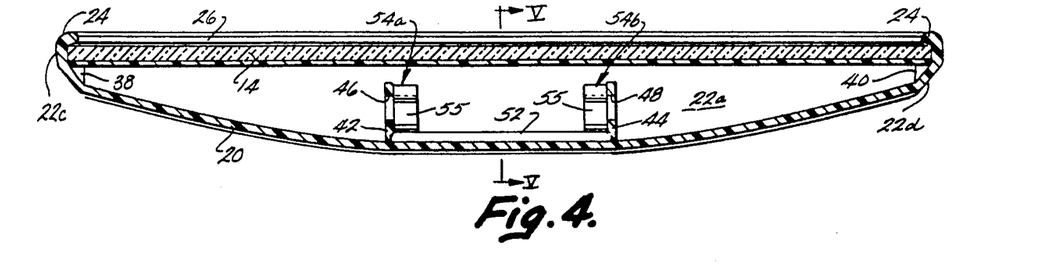
FIG. 4 is a top sectional view of the mirror case of FIG. 3 illustrating a glass mirror element mounted therein and taken along plane IV—IV of FIG. 3.

As shown in FIGS. 3 and 4, mirror case 12 also includes pairs of aligned, parallel, upstanding mirror supports 38, 40 on the interior of opposite ends 22c, 22d of the case. As shown in FIG. 5, these upstanding supports extend different distances to support the varying thickness of the prismatic mirror element 14 when retained in case 12 beneath inclined surface 28 of lip 24. When snapped in place, lip 24 tightly retains the mirror element against only supports 38, 40 to prevent any vibration or movement of the mirror element within the case. The mirror element is not supported by any other portions of the case.

As is best seen in FIGS. 3-6, the central, interior portion of case 12 includes a support area for pivot actuator or toggle member 60. The support area includes rectilinear, parallel, support walls 42, 44 each of which includes a free, rectilinear top edge which is spaced behind layer 18 of mirrow element 14 when received in case 12, and is generally parallel to coated rear surface 16 as shown in FIG. 5. Each of the support walls 42, 44 includes a cutout or opening 46, 48, respectively, having nonparallel top and bottom edge surfaces which converge toward top wall 22a. Openings 46, 48 are bounded by an area of increased thickness 47, 49 on the interior surface of each wall 42, 44, respectively, to strengthen the wall around the opening. Openings 46, 48 are designed to receive the pivot limiting stop tabs from pivot actuator 50 as described hereinafter. In order to strengthen the support area and case in its central section, a pair of upstanding, molded support ribs 50, 52 extend generally rectilinearly and parallel to one another but are spaced slightly apart across the area between walls 42, 44. Rib 50 is generally aligned with the contour lines 30 defining the area of maximum depth of the case in the area between walls 42, 44 immediately under aperture 34.

Molded integrally and extending inwardly from the inside surfaces of support walls 42, 44 are aligned pairs of pivot supports 54a, 54b and 56a, 56b which support the top and bottom pivot axles of the pivot actuator or toggle member 60 respectively. Pivot supports 54a, 54b each include an axle support wall 55 (FIG. 5) having an inside surface contour including cylindrical surfaces of two different radii joined by a planar surface 53 designed to match the exterior contour of the upper pivot axles stubs on the pivot actuator 60. Axle support walls 55 are, in turn, supported by ribs 57 extending between the upper sides of the walls 55 and the upper side wall 22a of the case.

Figure 7:
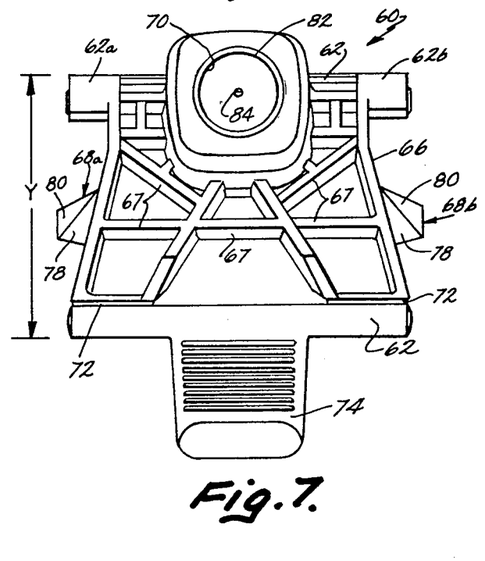
FIG. 7 is a rear view of a first embodiment of the pivot actuator of the present invention.
Figure 8:
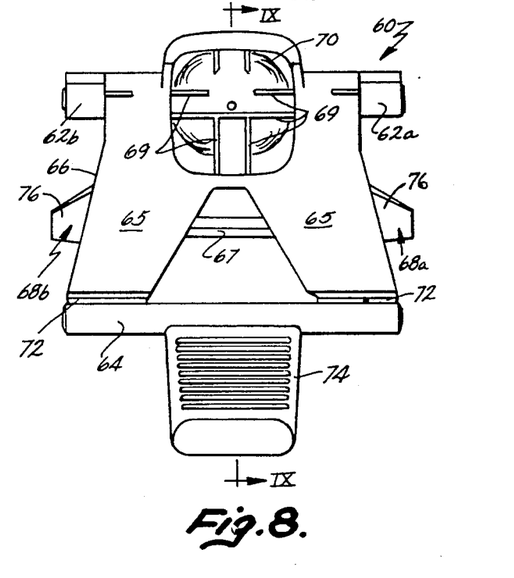
FIG. 8 is a front view of the pivot actuator shown in FIG. 7.
Figure 9:
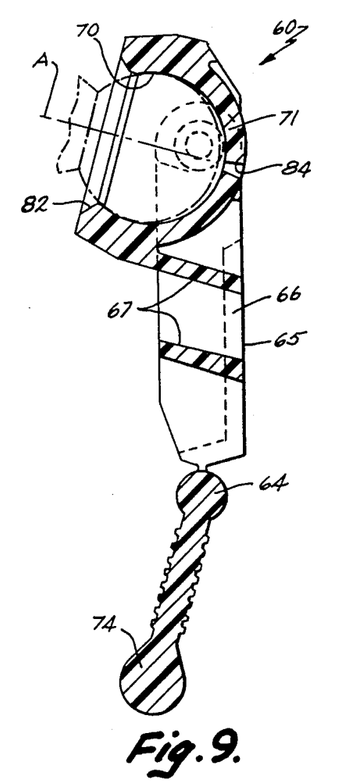
FIG. 9 is a side sectional view of the pivot actuator taken along plane IX—IX of FIG. 8.

Similarly, lower pivot supports 56a, 56b include axle support walls 58 supported by additional rib 59 extending between the axle support and bottom side wall portion 22b. Axle support 58 includes an inner, partially cylindrical uniform radius support opening generally toward an opposed, aligned one of the upper pivot supports 54a, 54b. As will be more fully described below, pivot actuator 60 is designed to be snapped in place between the sets of pivot supports 54, 56 and between support walls 42, 44 after molding of the case and prior to insertion of the mirror element 14. Referring now to FIGS. 7-9, a first embodiment 60 of the pivot actuator or toggle member is shown. Actuator 60 includes a pair of spaced pivot axles 62, 64 designed to be received in supports 54a and b, 56a and b, respectively, a rigid body 66 including a series of strengthening ribs or braces 67, a pair of opposed pivot limiting stop tabs 68a, 68b on opposite sides of the body 66, a mounting socket 70 extending outwardly from the upper pivot axle 62, and a pivot member including lower pivot axle 64 adapted to enable pivotal movement of the actuator between at least two positions, i.e., the forward or day and the rearward or night position when mounted within the case.

Upper pivot axle 62 includes a pair of stub axles 62a, 62b extending parallel to one another and in opposite directions from the upper side edges of the body 66 of actuator 60. Stub axles 62a, 62b have cylindrical surfaces of different radii joined by a planar surface in the same fashion as the inside surfaces of axle supports 55 on pivot supports 54a and b in case 12. The larger cylindrical surface extends approximately one third to one quarter of the way around the pivot axle, the increased radii providing the stub axle with greater strength. However, the smaller cylindrical radius portion enables the actuator to be more easily fitted in pivot supports 54a and b. Rigid body portion 66 includes a pair of diverging legs which are channel-shaped in section extending between the pivot axles. These legs provide a general V-shape for the body section as best seen in FIG. 8. The channel-shape provides weight reduction while the cross braces, such as those shown at 67 in FIGS. 7 and 9, both within the side wall of each diverging leg and between the legs themselves, provide significantly increased strength and rigidity for the body portion without adding significant weight. The front surfaces 65 of the diverging legs 66 lie in a common plane slightly offset from the center lines of the pivot axles 62, 64.

At the lower edges of the legs of the actuator pivot axle 64 is joined by a flexible, integrally molded living hinge 72. Projecting downwardly from the bottom of pivot axle 64 is a pivot or finger tab 74 having integral ribs molded thereon for ease in gripping. Living hinge 72, tab 74 and pivot axle 64 together form an over-center hinge assembly in combination with the rigid body 66 which operates as more fully described hereinafter.

Figure 11:
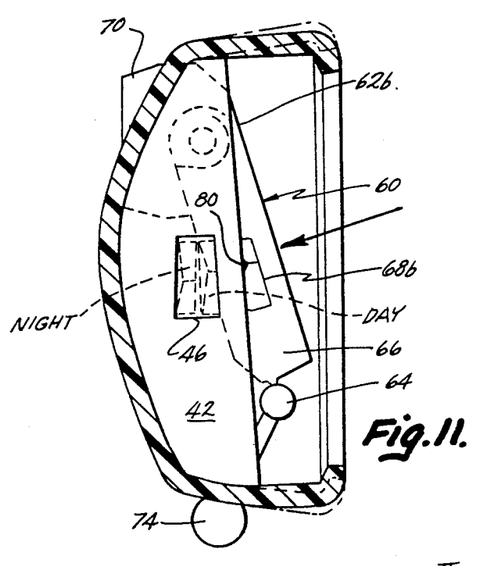
FIG. 11 is a side sectional view of the case during insertion of the pivot actuator of FIGS. 7-9 into the case.

Pivot limiting stop tabs 68a, 68b, which extend from the opposite side surfaces of the rigid body 66, each include multiple facets or planar surfaces intersecting one another as shown in FIGS. 6-8 and 11. The front surfaces 76 of stop tabs 68 are designed to engage the upper edge of cutout apertures 46, 48 in support walls 42, 44 to limit the pivotal movement of the actuator to its day position (FIG. 11). On the opposite side of each stop member, facets 78 provide a stop surface limiting pivotal movement of the actuator 60 to its night position (FIG. 11). Inclined facets 80 provide camming surfaces helping insertion of the actuator between the support walls 42, 44 when it is assembled within the case.

As shown in FIG. 9, the molded socket 70 has a central axis "A" which extends outwardly at an obtuse angle with respect to the plane of front surfaces 65 of legs 66. Socket 70 has a slightly elongated or egg shape and is not perfectly spherical such that a ball member from a support bracket does not touch socket wall 71 at all places (FIG. 9). Socket wall 71 has a substantially uniform thickness adapted to provide sufficient support for a ball member but allow insertion of such a ball without fracturing. Wall 71 is strengthened by braces 69. Inclined, conical lead-in surface 82 facilitates snap-in insertion of a spherical ball member from a mounting bracket or the like to be received in the socket as described in copending application Serial No. 276,838 incorporated above. Aperture 84 results from removal of a mold pin during manufacture. When received in case 12, socket 70 is adapted to project through upper corner aperture 34, while pivot tab 74 extends through lower corner aperture 36 as shown in FIG. 6.

Alternately, as shown in FIGS. 13-17, a revised form 60' of the pivot actuator is shown wherein like numerals indicate like parts to those shown in embodiment 60. Actuator 60' includes an outwardly extending ball member 86 in place of socket 70. Ball member 86 is molded into support area 85 at the apex of the diverging legs which form body 66 such that it extends outwardly from upper pivot axle 62. Ball member 86 preferably includes a zinc die cast or other metallic, spherical ball 87, neck 88, and a base including parallel circular members 89 and 90 about which is molded support area 85. Ball portion 87 is designed for receipt in a spherical cup or other receiving member in a mounting bracket extending between the pivot actuator and a support such as a metallic button on the windshield of a vehicle. The central axis of ball member 86 extends at the same angle as does the axis "A" of socket 70 with respect to the planar surfaces of diverging legs 65, and thus extends through upper corner aperture 34 when received in case 12. Accordingly, depending on whether actuator 60 or 60' is chosen, the assembled rearview mirror may be used with varying support brackets while continuing to provide complete adjustability for viewing by varying sizes of drivers.

Preferably, both case 12 and actuators 60 or 60' are molded in one piece from resinous, thermoplastic material such as a homopolymer or copolymer of polypropylene. Such material has been found to have the necessary strength and rigidity for forming the actuators 60, 60'. Yet in the configuration of the case 12, these materials have the necessary flexibility and resiliency to function as intended. Preferably, actuators 60, 60' are molded from a homopolymer of polypropylene such as Hercules 6523 made by Hercules, Inc. of Wilmington, Delaware, or equivalent. Hercules 6523 has the following properties:

Flexural modulus (ASTM D790B): 250,000 psi;
Hardness (ASTM D 785A): 99 (Rockwell R scale);
Deflection temperature (ASTM D648): 212° F. (66 psi;
Notched Izod impact strength (ASTM D 256A): 0.8 ft.-lbs./in (at 73° F.)

A preferred polypropylene copolymer for case 12 is Hercules 7523 or equivalent. Hercules 7523 has the following properties:

Flexural modulus (ASTM D790B): 185,000 psi;
Hardness (ASTM D785A): 80 (Rockwell R scale);

Deflection temperature (ASTM D648): 81° F. (at 66 psi);

Notched Izod impact strength (ASTM D256A): 2.5 ft.-lbs./in (at 73° F.)

It has been found that the actuator, mirror element and case can be best assembled within a predetermined time period after completion of the molding of the case so as to utilize the case while its temperature remains above a predetermined level at which the case has a greater flexibility and lesser resiliency which facilitates assembly. Initially, the cylindrical surfaces of pivot supports 56a, 56b are coated with a suitable lubricant such as a grease sold as Lubriplate 930-2 by Firske Bros. Refinery, Newark, New Jersey. The grease provides consistency in the pivot torque for movement between day and night positions. One of the actuators 60 or 60' is then inserted as shown in FIG. 11 such that socket 70 or ball member 86 projects through aperture 34 while pivot tab 74 and pivot axle 64 are rotated such that pivot tab 74 extends through lower corner aperture 36. Inclined surfaces 80 of pivot limiting stop tabs 68a, 68b are brought into engagement with the rectilinear upper edge surfaces of support walls 42, 44 while pivot stub axles 62a, 62b are being pushed into and seated within the cylindrical surfaces of pivot supports 54a, 54b all as shown in FIG. 11. Thereafter, sufficient force is applied in the direction of the arrow in FIG. 11 to force actuator 60 downwardly between support walls 42, 44 such that inclined camming surfaces 80 on the pivot limiting stop tabs 68a, 68b force walls 42, 44 to bulge outwardly allowing the pivot stop tabs to pass between them and into apertures 46, 48. Since case 12 is at an elevated temperature, the support walls 42, 44 have a greater degree of flexibility and lesser resiliency than after a longer period of cooling, thereby facilitating the above insertion process. When stop tabs 68a, 68b are received within apertures 46, 48, the lower pivot axle 64 is seated in pivot supports 56a, 56b as shown in FIG. 6.

Figure 12:
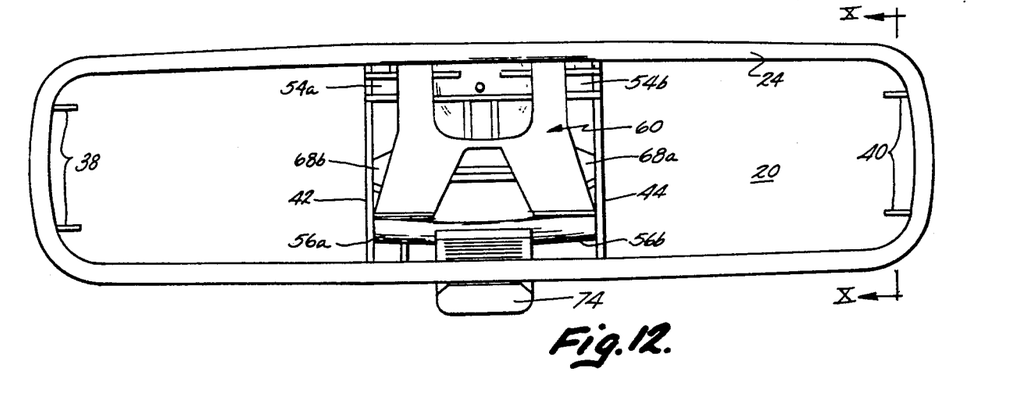
FIG. 12 is a front plane view of the case with the pivot actuator of FIGS. 7-9 mounted therein.
Figure 13:
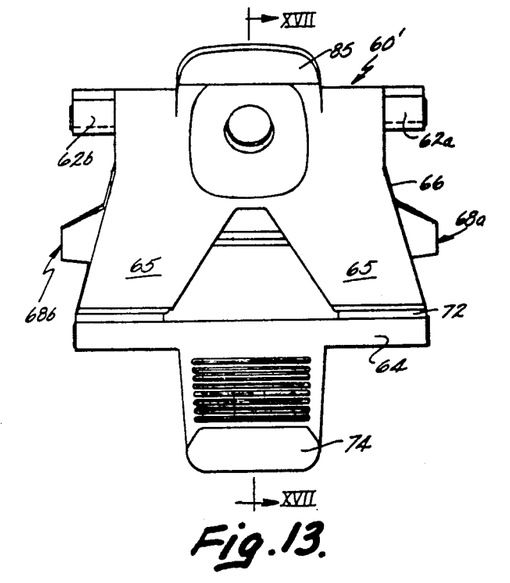
FIG. 13 is a front view of a second embodiment of the pivot actuator of the present invention.
Figure 14:
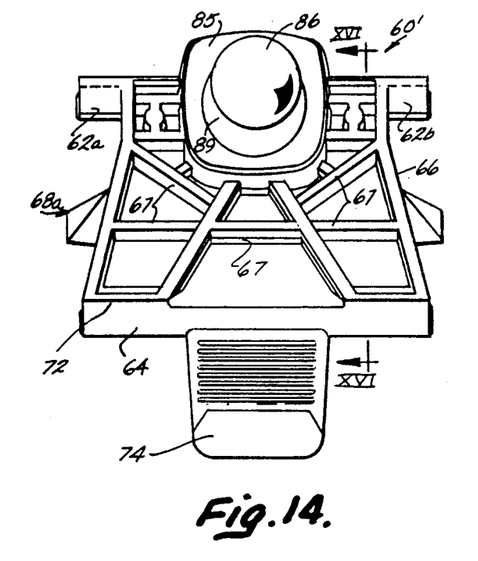
FIG. 14 is a rear view of the pivot actuator as shown in FIG. 13.
Figure 15:
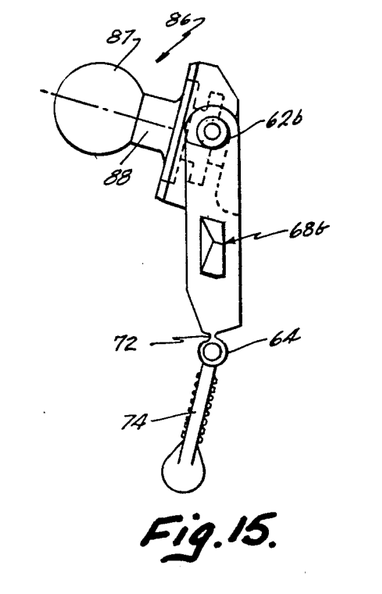
FIG. 15 is a side view of the pivot actuator shown in FIGS. 13 and 14.
Figure 16:
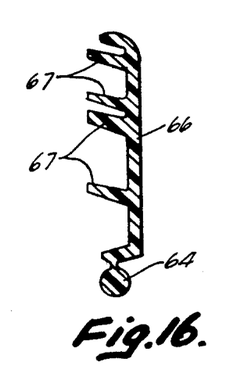
FIG. 16 is a side sectional view of the pivot actuator taken along plane XVI—XVI of FIG. 14.
Figure 17:
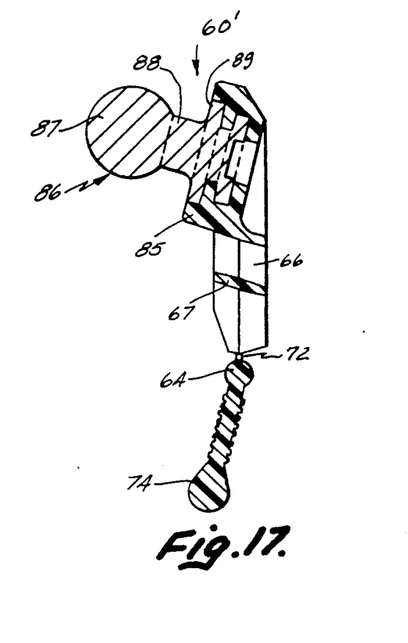
FIG. 17 is a side sectional view of the actuator taken along plane XVII—XVII of FIG. 13.

Inasmuch as actuators 60, 60' include rigid bodies 66 which maintain a predetermined spacing between axles 62, 64, an interference fit is provided between the pivot axles of the actuator and the pivot supports of case 12 by making the distance Y (FIG. 7) between the outside surfaces of the pivot axles slightly greater than the distance X (FIG. 5), the greatest distance between the cylindrical surfaces of the pivot supports. Accordingly, when actuator 60, 60' is snapped into place as described above, this interference, which is 0.030 inches in the preferred embodiment, flexes the side walls 22 and a portion of the case back 20 outwardly in the manner shown in phantom in FIG. 11. This provides a prestressed condition which causes the lower axle 64 to bow slightly intermediate the supports 56a, 56b as shown in FIG. 12. After the assembled case and actuator have cooled sufficiently to ambient, normal temperatures, the resiliency of the resinous, thermoplastic material at those temperatures constantly biases the over-center pivot assembly on the actuator into one or the other of its two positions as limited by the stop tabs within apertures 46, 48. Accordingly, the case itself acts as a spring member urging the pivot actuator to either its day or night position and maintaining the actuator in that position. The preferred flip angle of movement between the day and night positions of actuator 60 or 60' is 5°29'±0°30' using the pivot limiting stop tabs 68 and apertures 46, 48.

Figure 10:
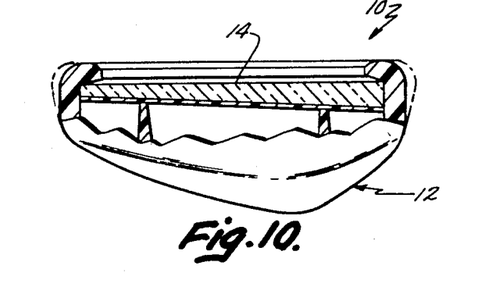
FIG. 10 is a sectional view of the mirror case showing the mirror element as supported at the end of the case taken along plane X—X of FIG. 12.

Before the case has cooled to ambient temperatures, however, the increased flexibility and reduced resiliency of the continuous side walls 22 of the case 12 facilitates insertion of the prism mirror element 14 by snapping it into position as shown in FIG. 10. Such insertion is facilitated by bevel 19 on the rear edge corner of the mirror element camming against the rounded surface of lip 24 adjacent edge 26 such that the top, bottom and end surfaces of the case are flexed outwardly (FIG. 10). This allows inward movement of the mirror element to a position under lip 24 and against supports 38, 40. Thereafter, the continuous lip flexes inwardly from its expanded position to retain the edge of the mirror element under the lip 24.

It has been found that, with the preferred materials noted above, the insertion of both the actuator 60 or 60' and the mirror element 14 is best achieved within one to three minutes after removal of the case from the mold so as to take advantage of the greater flexibility and lesser resiliency of the case at an elevated temperature. Thereafter, the case cools to retain mirror element and actuators in position and to provide the prestressed, biasing force described above.

During use of the mirror assembly described above, it will be noted that, as shown in FIG. 6, pivotal movement of the tab 74 between its day and night position increases the distance between axles 62, 64 when tab 74 and hinges 72 are generally parallel to the front surface 65 of rigid body 66 and until the actuator is over-center toward one position or the other. Such increased distance flexes the continuous side walls and a portion of case back 20 outwardly (FIGS. 10 and 11) against the natural resiliency of the case providing a predetermined force level which must be overcome by a pivoting torque or force applied against pivot tab 74. Once such force is applied and the pivot tab is moved over center, the biasing force of the case will snap the actuator into its opposite position as limited by the surfaces on pivot limiting stop tabs 68 within apertures 46, 48. Depending on the magnitude of the interference fit between actuator 60 or 60' and supports 54, 56, and the stiffness and resiliency of the case and actuator, which can be varied by the amount of case set or cooling allowed before actuator insertion, such pivoting force will preferably be between about one and three pounds. This is sufficient to allow movement between day and night positions while providing good feel and keeping the actuator in one of its positions after movement in accord with desired design objectives. In addition, pivot limiting stop tabs 68 provide positive assurance against premature removal of the pivot actuator or toggle assembly from pivot supports 54, 56 such as could occur by a sharp force applied against the mirror assembly tending to move the pivot actuator forwardly towards the mirror element when mounted in a vehicle. The closed apertures 46, 48 which limit movement of the pivot stop tabs 68 effectively prevent such removal of the actuator after assembly.

Accordingly, the present invention provides a simplified, highly reliable rearview mirror assembly which provides requisite strength with lightness, fewer overall parts compared to prior known mirror assemblies, simplified assembly procedures coupled with consequent reduction in rejection rates for the assemblies, and more positive control of the day/night pivoting action. In addition, the assembly is adapted to meet safety requirements for major vehicle producing countries.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In a day/night rearview mirror assembly for vehicles including a mirror case and a pivot actuator, said case being formed in one piece from a resinous material and having a back, a continuous peripheral side wall adapted to outline the peripheral edge of a mirror element, and support means for supporting said pivot actuator within said case, said pivot actuator having mounting means for mounting a bracket for securing said assembly on a support and pivot means for pivoting said actuator and case between at least two different positions with respect to said mounting means, the improvement comprising:

said molded case including flexible, resilient portions and having a preformed lip on said continuous peripheral side wall for retaining a mirror element within said case; said pivot actuator being substantially rigid; said case portions being sufficiently flexible and resilient to bias said actuator toward one or the other of said actuator positions; said support means supporting said actuator in a prestressed position when assembled in said case while said lip extends inwardly a distance sufficient such that when a mirror element is received within said case, and said actuator is pivoted with said pivot means, said case will flex with respect to said rigid actuator to allow the pivotal movement while said lip will continue to cover the edge of the mirror element and a predetermined portion of the mirror element spaced inwardly from the edge thereof regardless of the flexing action of said case and said lip during such pivoting.

2. The rearview mirror assembly of claim 1 wherein said lip extends continuously around the entirety of said continuous peripheral side wall; said case being molded from a thermoplastic, resinous material such that said wall is sufficiently flexible and resilient within a predetermined period of time following the completion of such molding while said case remains above a predetermined temperature to allow snap-in insertion of a mirror element into said case within said predetermined period, said case having a lesser amount of flexibility but greater resiliency after cooling below said predetermined temperature for said predetermined period.

3. The rearview mirror assembly of claim 2 wherein said side of said case increases in thickness from said back toward said lip.

4. The rearview mirror assembly of claim 2 wherein said back of said case curves outwardly to an area of maximum overall case depth to facilitate flexing of said case during pivoting of said pivot means.

5. The rearview mirror assembly of claim 4 wherein said continuous side wall includes portions defining a top, a bottom, and ends of said case; said area of maximum depth being defined by a line extending along the back of the case from positions closer to said top and adjacent either end of the case to a position near the center of the back of said case.

6. The rearview mirror assembly of claim 5 wherein said case includes top and bottom corners between said top and bottom side wall portions and said case back; said case including a pair of apertures extending through said top and bottom corners generally midway between said ends, one of said apertures extending through said top corner and the other through said bottom corner; said line defining said maximum case depth extending intermediate said apertures and immediately adjacent said aperture through said top corner.

7. The rearview mirror assembly of claim 6 wherein said case includes an inwardly projecting support rib on the interior surface of said case aligned with said line defining said maximum case depth for a distance at least intermediate said apertures.

8. The rearview mirror assembly of claim 2 wherein said continuous lip has a rounded outer surface to facilitate insertion of a mirror element and an inclined under surface adapted to face the mirror element when received in said case.

9. The rearview mirror assembly of claims 1, 2 or 8 wherein said assembly includes a mirror element; said continuous side wall including portions defining a top, a bottom, and ends of said case; said case including upstanding supports on the interior surface thereof at the ends of said case for supporting said mirror element immediately beneath said lip on said continuous side wall.

10. The rearview mirror assembly of claim 9 including a prism mirror element inserted between said lip and said upstanding supports within said case; said prism mirror element having non-parallel, planar, front and back surfaces, a coating of reflective material on at least one of said surfaces, and a layer of flexible, resilient material bonded to said back surface to retain any fragments should the mirror element be broken.

11. The rearview mirror assembly of claim 1 or 2 wherein said mirror element includes a bevel between said back surface and the peripheral edge thereof and extending around the entire mirror element to facilitate insertion.

12. The rearview mirror assembly of claim 1 including a prism mirror element.

13. The rearview mirror assembly of claim 1 wherein said continuous side wall includes portions defining a top, a bottom, and ends of said case; said support means including a pair of inwardly projecting, pivot actuator support walls spaced apart on the interior surface of said mirror case and extending across the interior of said case between said top and bottom.

14. The rearview mirror assembly of claim 13 wherein said case includes at least one support rib extending between said actuator support walls on the inside surface of said case.

15. The rearview mirror assembly of claim 14 including a second of said support ribs extending between said actuator support walls, said second support rib being spaced from said first rib, at least one of said support ribs being aligned with an area of maximum depth of said case.

16. The rearview mirror assembly of claim 14 wherein said support rib is immediately adjacent an aperture extending through said back of said case provided for a portion of said pivot actuator.

17. The rearview mirror assembly of claim 13 or 14 wherein said support means further include spaced pivot supports in the area between said support walls fo receiving said pivot actuator.

18. The rearview mirror assembly of claim 17 wherein said pivot actuator includes a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab.

19. The rearview mirror assembly of claim 18 wherein said spaced pivot supports are spaced closer together than are said pivot axles whereby, when said pivot actuator is received in said pivot supports, said case is slightly flexed and requires a predetermined force to pivot said pivot means to move said case between said two positions.

20. The rearview mirror assembly of claim 17 wherein said pivot supports include two pair of axle supports formed integrally with said support walls, one pair of axle supports adjacent the top interior of said case, the other pair of axles supports adjacent the bottom interior of said case, each of said axle supports in each pair extending from a different one of said support walls in said pair toward the other axle support and aligned with one of the axle supports in the other pair such that said axle supports are opposed to one another both across said case and across the area between said support walls.

21. The rearview mirror assembly of claim 20 wherein each of said axle supports includes a cylindrical surface for supporting a portion of a cylindrical axle extending from a pivot actuator, and rib means spaced from said support wall for supporting said axle supports against a portion of the continuous side wall of said case.

22. The rearview mirror assembly of claim 13 wherein each of said support walls includes an aperture therethrough for receiving a pivot limiting tab from a pivot actuator.

23. The rearview mirror assembly of claim 22 wherein said case, including said support walls, is molded from a thermoplastic, resinous material, and is sufficiently flexible and resilient within a predetermined time period after molding to allow snap-in insertion of a pivot actuator such that any pivot limiting tabs on said actuator are received within said apertures in said support walls.

24. The rearview mirror assembly of claim 14, 15 or 16 wherein said support walls have free edges within said case, said free edges adapted to be spaced from the back of any mirror element when received within said case.

25. The rearview mirror assembly of claim 1 wherein said pivot actuator also includes a pair of spaced pivot axles received in said support means and rigid body means for holding said axles apart at a predetermined spacing.

26. The rearview mirror assembly of claim 25 wherein said rigid body means is V-shaped and includes a pair of diverging legs extending between said pair of pivot axles.

27. The rearview mirror assembly of claim 26 wherein each of said diverging legs is channel-shaped in cross section and includes a series of braces extending between the sidewalls of the channel; said pivot actuator also including a brace member extending between said diverging legs.

28. The rearview mirror assembly of claim 27 wherein said diverging legs lie in a common plane including one of said pivot axles; said mounting means extending at an angle to said plane of said diverging legs.

29. The rearview mirror assembly of claim 28 wherein said pivot actuator is molded from resinous material; said mounting means including a socket adapted to receive a ball member for attaching said assembly to a support, said socket being molded integrally with said one pivot axle and said rigid body means.

30. The rearview mirror assembly of claim 28 wherein said mounting means include a ball member extending outwardly from said rigid body means.

31. The rearview mirror assembly of claim 25 wherein said pivot means includes over-center hinge means having one of said pair of pivot axles for moving said actuator and case, flexible connection means for pivotally connecting said one pivot axle to said rigid body means, and a pivot tab fixedly connected to said one pivot axle for pivoting said one pivot axle, and thus, said entire pivot actuator.

32. The rearview mirror assembly of claim 25 or claim 31 including a pair of pivot limiting tabs extending from said rigid body means for limiting movement between said two positions, one tab on each side of said rigid body means; each of said tabs including a plurality of facets extending at different angles; one of said facets providing an inclined surface facilitating assembly of said pivot actuator in said support means; another pair of said facets providing spaced pivot limiting abutment surfaces.

33. The rearview mirror assembly of claim 1 wherein said rigid pivot actuator is sufficiently large to slightly expand said case when received in said support means whereby a predetermined torque force is required to pivot said actuator between said positions.

34. A day/night rearview mirror assembly for vehicles comprising a mirror case having flexible, resilient portions and formed in one piece from a resinous material, and rigid actuator means mounted within said case for moving said case between day and night positions;
   said case having a back, a continuous peripheral side wall adapted to outline the peripheral edge of a mirror element, retaining means for retaining a mirror element in said case, and support means for supporting said rigid actuator means in a prestressed position within said case;
   said rigid actuator means including mounting means for mounting a bracket for securing said assembly on a support and pivot means for pivoting said rigid actuator and case between said positions;
   said case biasing said rigid actuator means toward one or the other of said positions such that a predetermined force is required to pivot said rigid actuator means and case with said pivot means; said flexible, resilient portions of said case adapted to flex with respect to said rigid actuator means to allow the pivotal movement between said positions.

35. The rearview mirror assembly of claim 34 wherein said case back curves outwardly to an area of maximum overall case depth to facilitate flexing of said case during use of said pivot means.

36. The rearview mirror assembly of claim 35 wherein said case back curves outwardly both transversely across and longitudinally along said case.

37. The rear view mirror assembly of claim 35 wherein said continuous side walls includes portions defining a top, a bottom, and ends of said case; said area of maximum depth being defined by a line extending along the back of the case from positions closer to said top and adjacent either end of the case to a position near the center of the back of said case.

38. The rearview mirror assembly of claim 37 wherein said case includes top and bottom corners between said top and bottom side wall portions and said case back; said case including a pair of apertures extending through said top and bottom corners generally midway between said ends, one of said apertures extending through said top corner and the other through said bottom corner; said line defining said maximum case depth extending intermediate said apertures and immediately adjacent said aperture through said top corner; said mounting means projecting through said top corner aperture; said pivot means projecting through said bottom corner aperture.

39. The rearview mirror assembly of claim 34 wherein said retaining means includes a lip extending along said continuous peripheral side wall and inwardly toward the center of said case, said lip adapted to allow snap-in insertion of a mirror element into said case.

40. The rearview mirror assembly of claim 34 wherein said continuous side wall includes portions defining a top, a bottom, and ends of said case; said support means including a pair of inwardly projecting, pivot actuator support walls spaced apart on the interior surface of said mirror case and extending across the interior of said case between said top and bottom, and spaced pivot supports in that area between said support walls for receiving actuator means.

41. The rearview mirror assembly of claim 40 wherein said actuator means includes a pair of spaced pivot axles received in said spaced pivot supports and rigid body means for holding said axles apart at a predetermined spacing and being substantially rigid and inflexible between said pivot supports and axles.

42. The rearview mirror assembly of claim 41 wherein said spaced pivot supports are spaced slightly closer together than are said pivot axles whereby, when said actuator means is received in said pivot supports, said case is slightly flexed and requires a predetermined force to pivot said pivot means to move said case between said two positions.

43. The rearview mirror assembly of claim 42 including a pair of pivot limiting tabs extending from said rigid body means for limiting movement between said two positions, one tab on each side of said rigid body means; each of said tabs including a plurality of facets extending at different angles; one of said facets providing an inclined surface facilitating assembly of said actuator means in said support means; another pair of said facets providing spaced pivot limiting abutment surfaces.

44. The rearview mirror assembly of claim 41 wherein said pivot means includes over-center hinge means having one of said pair of pivot axes for moving said actuator means, and flexible connection means for pivotally connecting said one pivot axle to said rigid body means, and a pivot tab fixedly connected to said one pivot axle for pivoting said one pivot axle, and thus, said entire pivot actuator means.

45. The rearview mirror assembly of claim 40 wherein said support walls have free edges within said case, said free edges adapted to be spaced from the back of any mirror element when received within said case.

46. The rearview mirror assembly of claim 34 wherein said mounting means includes a socket adapted to receive a ball member for attaching said assembly to a support.

47. The rearview mirror assembly of claim 34 wherein said mounting means include a ball member extending outwardly from said rigid body means.

48. A molded case for a day/night rearview mirror assembly for vehicles, said case having inherently flexible and resilient portions, being molded in one piece from resinous material and including a back, a continuous peripheral side wall adapted to outline the peripheral edge of a mirror element, a preformed lip on said continuous peripheral side wall for retaining a mirror element within said case, said lip being adapted to allow snap-in insertion of a mirror element into said case, and support means for supporting a pivot actuator in said case in a prestressed position for pivotal movement within said case; said case portions being sufficiently flexible and resilient to bias a pivot actuator toward a predetermined position when received in said support means; said lip extending inwardly a distance sufficient such that, when a mirror element is received in said case and a pivot actuator is pivoted therein, said lip will continue to cover the edge of the mirror element and a predetermined portion of the mirror element spaced inwardly from the edge thereof regardless of the flexing action of said case and said lip during such pivoting.

49. The rearview mirror assembly of claim 48 wherein said lip extends continuously around the entirety of said continuous peripheral side wall; said case being molded from a thermoplastic, resinous material such that said wall is sufficiently flexible and resillient within a predetermined period of time following the completion of such molding while said case remains above a predetermined temperature to allow snap-in insertion of a mirror element into a said case within said predetermined period, said case having a lesser amount of flexibility but greater resiliency after cooling below said predetermined temperature for said predetermined period.

50. The rearview mirror assembly of claim 49 wherein said side of said case increases in thickness from said back toward said lip.

51. The rearview mirror assembly of claim 49 wherein said back of said case curves outwardly to an area of maximum overall case depth to facilitate flexing of said case during pivoting of said pivot means.

52. The rearview mirror assembly of claim 51 wherein said continuous side wall includes portions defining a top, a bottom, and ends of said case; said area of maximum depth being defined by a line extending along the back of the case from positions closer to said top and adjacent either end of the case to a position near the center of the back of said case.

53. The rearview mirror assembly of claim 52 wherein said case includes top and bottom corners between said top and bottom side wall portions and said case back; said case including a pair of apertures extending through said top and bottom corners generally midway between said ends, one of said apertures extending through said top corner and the other through said bottom corner; said line defining said maximum case depth extending intermediate said apertures and immediately adjacent said aperture through said top corner.

54. The rearview mirror assembly of claim 48 or 49 wherein said continuous lip has a rounded outer surface to facilitate insertion of a mirror element and an inclined undersurface adapted to face the mirror element when received in said case.

55. The rearview mirror assembly of claim 48 wherein said assembly includes a mirror element; said continuous side wall including portions defining a top, a bottom, and ends of said case; said case including upstanding supports on the interior surface thereof at the ends of said case for supporting said mirror element immediately beneath said lip on said continuous side wall.

56. The rearview mirror assembly of claim 48 wherein said continuous side wall includes portions defining a top, a bottom, and ends of said case; said support means including a pair of inwardly projecting, pivot actuator support walls spaced apart on the interior surface of said case between said top and bottom, said support means further include spaced pivot supports in the area between said support walls for receiving said pivot actuator, each of said support walls including an aperture therethrough for receiving a pivot limiting tab from a pivot actuator.

57. The rearview mirror assembly of claim 56 wherein said case includes at least one support rib extending between said pivot actuator support walls on the inside surface of said case.

58. A pivot actuator for day/night rearview mirror assemblies for vehicles comprising a pair of spaced pivot axles, rigid body means for holding said axles apart at a predetermined spacing and being substantially rigid and inflexible between said pivot supports and axles, and at least one pivot limiting tab extending from said rigid body means for limiting movement between said two positions; pivot means for pivoting said actuator when received in a day/night rearview mirror case; and mounting means for mounting a bracket for securing a mirror assembly to a support.

59. The rearview mirror assembly of claim 58 wherein said rigid body means is V-shaped and includes a pair of diverging legs extending between said pair of pivot axles.

60. The rearview mirror assembly of claim 59 wherein each of said diverging legs is channel-shaped in cross section and includes a series of braces extending between the side walls of the channel; said actuator also including a brace member extending between said diverging legs.

61. The rearview mirror assembly of claim 60 wherein said diverging legs lie in a common plane including one of said pivot axles; said mounting means extending at an angle to said plane of said diverging legs.

62. The rearview mirror assembly of claim 61 wherein said actuator is molded from resinous material; said mounting means including a socket adapted to receive a ball member for attaching said assembly to a support, said socket being molded integrally with said one pivot axle and said rigid body means.

63. The rearview mirror assembly of claim 61 wherein said mounting means include a ball member extending outwardly from said rigid body means.

64. The rearview mirror assembly of claim 58 wherein said pivot means includes over-center hinge means having one of said pair of pivot axles, flexible connection means for pivotally connecting said one pivot axle to said rigid body means, and a pivot tab fixedly connected to said one pivot axle for pivoting said one pivot axle, and thus, said entire pivot actuator.

65. The rearview mirror assembly of claim 58 including a pair of said pivot limiting tabs, one tab on each side of said rigid body means; each of said tabs including a plurality of facets extending at different angles; one of said facets providing an inclined surface facilitating assembly of said pivot actuator in said support means; another pair of said facets providing spaced, pivot limiting abutment surfaces.

* * * * *

UNITED STATES PATENT AND TRADEMARK OFFICE
CERTIFICATE OF CORRECTION

PATENT NO. : 4,436,371

DATED : March 13, 1984

INVENTOR(S) : Denis Wood, et al

It is certified that error appears in the above-identified patent and that said Letters Patent is hereby corrected as shown below:

The title page should be deleted to appear as per attached title page.

United States Patent [19]

Wood et al.

[11] 4,436,371
[45] Mar. 13, 1984

[54] VEHICLE MIRROR ASSEMBLY

[75] Inventors: Denis Wood, Dublin, Ireland; John F. Thomas, Jr., Holland, Mich.; Barry Dipper, Cardiff, Wales

[73] Assignee: Donnelly Mirrors, Inc., Holland, Mich.

[21] Appl. No.: 276,969

[22] Filed: Jun. 24, 1981

[51] Int. Cl.³ .............................................. G02B 17/00
[52] U.S. Cl. .................................. 350/281; 350/278; 350/279
[58] Field of Search ....................... 350/279, 280, 281

[56] References Cited

U.S. PATENT DOCUMENTS

| D. 81,345 | 6/1930 | Mariani . |
| D. 84,252 | 5/1931 | Mariani . |
| D. 170,683 | 10/1953 | Fischer . |
| D. 170,684 | 10/1953 | Fischer . |
| D. 178,645 | 9/1956 | Collura . |
| D. 178,646 | 9/1956 | Collura . |
| D. 179,987 | 4/1957 | Stortz . |
| D. 188,370 | 7/1960 | Grove . |
| D. 192,633 | 4/1962 | Stortz . |
| D. 192,728 | 5/1962 | Walker . |
| D. 197,888 | 4/1964 | Jepson et al. . |
| D. 250,332 | 11/1978 | Aiga . |
| 614,503 | 11/1898 | Sackett . |
| 925,524 | 6/1909 | Steinmetz . |
| 1,252,207 | 1/1918 | Walker . |
| 1,929,201 | 10/1933 | Frohlich et al. . |
| 2,088,320 | 7/1937 | De Vries . |
| 2,457,639 | 12/1948 | Brooks . |
| 2,771,263 | 11/1956 | Boho . |
| 2,775,919 | 1/1957 | Fischer . |
| 2,823,479 | 2/1958 | Adanowski . |
| 2,940,361 | 6/1960 | Francisco . |
| 2,968,995 | 1/1961 | Holden . |
| 3,120,369 | 2/1964 | Gray, Jr. . |
| 3,131,251 | 4/1964 | Ryan . |
| 3,427,095 | 2/1969 | Dykema et al. . |
| 3,512,746 | 5/1970 | Vitaloni et al. . |
| 3,513,807 | 5/1970 | Helle . |
| 3,534,938 | 10/1970 | Jordan et al. . |
| 3,564,984 | 2/1971 | Alexander . |
| 3,589,662 | 6/1971 | Lagrange . |
| 3,601,352 | 8/1971 | Jensen et al. . |
| 3,666,225 | 5/1972 | Weinberger . |
| 3,800,449 | 4/1974 | Minatodani et al. . |
| 3,828,623 | 8/1974 | Zillner . |
| 3,869,017 | 3/1975 | Feustel et al. . |
| 3,918,799 | 11/1975 | Kurz, Jr. et al. . |
| 3,954,242 | 5/1976 | Yoda . |
| 4,012,022 | 3/1977 | Tomita . |

FOREIGN PATENT DOCUMENTS

| 1780550 | 3/1965 | Fed. Rep. of Germany . |
| 1199641 | 8/1965 | Fed. Rep. of Germany . |
| 1275394 | 8/1968 | Fed. Rep. of Germany . |
| 2024118 | 11/1970 | Fed. Rep. of Germany . |
| 2153875 | 5/1973 | Fed. Rep. of Germany . |
| 2414075 | 3/1974 | Fed. Rep. of Germany . |
| 2357543 | 9/1974 | Fed. Rep. of Germany . |
| 2530596 | 1/1977 | Fed. Rep. of Germany . |
| 2539681 | 3/1977 | Fed. Rep. of Germany . |
| 7111507 | 4/1971 | France . |
| 7245225 | 12/1972 | France . |
| 7409477 | 10/1973 | France . |
| 7316857 | 11/1974 | France . |
| 2354219 | 6/1976 | France . |
| 7710637 | 4/1977 | France . |
| 4137 | 1/1977 | Ireland . |
| 421078 | 1/1935 | United Kingdom . |
| 742838 | 1/1956 | United Kingdom . |
| 768637 | 2/1957 | United Kingdom . |
| 1096178 | 1/1968 | United Kingdom . |

OTHER PUBLICATIONS

George C. Knight Co. brochure entitled "Crusader--Complete View Mirrors", dated Oct. 26, 1949.

U.S. Government "Motor Vehicle Safety Standard No. 111 for Rearview Mirrors", dated Feb. 26, 1977.

EEC European Motor Vehicle Regulations 0.08.39, 2.04.05, dated Mar. 1, 1971.

Federal Motor Vehicle Safety Standard No. 111, "Laboratory Procedures for: Rearview Mirrors", dated Nov. 29, 1978, U.S. Dept. of Transportation, National Highway Traffic Safety Administration, Enforcement Office of Vehicle Compliance.

*Primary Examiner*—John K. Corbin
*Assistant Examiner*—Paul M. Dzierzynski
*Attorney, Agent, or Firm*—Price, Heneveld, Huizenga & Cooper

[57] ABSTRACT

A day/night rearview mirror assembly for vehicles including a one-piece, molded, resinous mirror case having flexible, resilient portions and a substantially rigid pivot actuator which is biased by the case into either a day or night position. Movement of the actuator changes the position of the case and mirror element thereby changing the amount of light reflected. An interference fit between supports for the actuator within the case and the pivot actuator expands and pre-stresses the case to provide a predetermined biasing force which must be overcome by a pivoting force to move the actuator between its positions. A continuous lip extending around the periphery of the case allows snap-in insertion and permanent retention of a preferably prismatic mirror element. The retaining lip is sized to maintain coverage of the edge of the mirror element even during flexing of the case while the actuator is pivoted.

65 Claims, 17 Drawing Figures

UNITED STATES PATENT AND TRADEMARK OFFICE
CERTIFICATE OF CORRECTION

PATENT NO. : 4,436,371

DATED : March 13, 1984

INVENTOR(S) : Denis Wood, John F. Thomas, Jr., and Barry Dipper

It is certified that error appears in the above-identified patent and that said Letters Patent is hereby corrected as shown below:

Column 2, line 26:

"data" should be --date--

Column 4, line 9:

"plane" should be --plan--

Column 4, line 58:

"quantities" should be --qualities--

Column 6, line 36:

"mirrow" should be --mirror--

UNITED STATES PATENT AND TRADEMARK OFFICE
CERTIFICATE OF CORRECTION

PATENT NO. : 4,436,371

DATED : March 13, 1984

INVENTOR(S) : Denis Wood, John F. Thomas, Jr., and Barry Dipper

It is certified that error appears in the above-identified patent and that said Letters Patent is hereby corrected as shown below:

Column 6, line 35:

"rectlinear" should be --rectilinear--

Column 12, claim 17, line 63:

"fo" should be --for--

Column 15, claim 44, line 53:

"axes" should be --axles--

Column 16, claim 49, line 29:

"resillient" should be --resilient--

Signed and Sealed this

Eighth Day of January 1985

[SEAL]

Attest:

Attesting Officer

GERALD J. MOSSINGHOFF

Commissioner of Patents and Trademarks